United States Patent [19]

Naiman et al.

[11] 3,833,805

[45] Sept. 3, 1974

[54] LASER SYSTEM

[75] Inventors: Charles S. Naiman, Brookline, Mass.; E. P. Chicklis, Merrimack, N.H.; Arthur Linz, Winchester, Mass.

[73] Assignee: Sanders Associates, Inc., Nashua, N.H.

[22] Filed: May 1, 1972

[21] Appl. No.: 249,172

[52] U.S. Cl. ............................... 250/199, 331/94.5
[51] Int. Cl. ............................................. H01s 3/12
[58] Field of Search ........ 331/94.5; 250/199; 356/.5

[56] References Cited
UNITED STATES PATENTS
3,527,949   9/1970   Huth et al. ........................... 250/199

OTHER PUBLICATIONS

CRC Handbook of Lasers, pg. 392, 414, 381, 416; 1971.
CRC Handbook of Lasers, pg. 368–369, 1971; GaAs at .83–.91u.
Hormer et al., "Flourescence of $Nd^{3+}$ inLiYF", 6/69, pg. 1483–1491, Jour. of Phys & Chem. of Solids, Vol. 30, No. 6.
Johnson, "Optically pumped Pulsed Crystal Lasers Other than Ruby," 1966, pg. 137–155, Lasers, Vol. 1, Pub. by Marcel Dekker.
Chickles et al., "High Efficiency Room Temp., $Ho^{3+}$YLF," 8/15/71, pg. 119–121, A.P.L., Vol. 19, No. 4.

*Primary Examiner*—Maynard R. Wilbur
*Assistant Examiner*—N. Moskowitz
*Attorney, Agent, or Firm*—Louis Etlinger; Richard I. Seligman

[57] ABSTRACT

A room temperature optically pumped solid state laser operating in the 0.8 to 0.9 micron region with inherently low beam divergence enchances covert laser systems because of compatability with high quantum efficiency low noise photocathodes.

4 Claims, 3 Drawing Figures

PATENTED SEP 3 1974                                3,833,805

LASER SYSTEM

BACKGROUND OF THE INVENTION

The performance of covert illuminators is presently constrained by laser sources which either emit with high brightness in a wavelength region beyond the range of high quantum efficiency low noise imaging devices or by sources which exhibit inherently low brightness but operate in a wavelenghth region of high sensitivity detectors.

In general, active night viewing systems employ either GaAs illuminators coupled with high quantum efficiency-low noise imaging photocathode surfaces (S-20, GaAs) or Nd: YAG illuminators coupled with low quantum efficiency photocathode surfaces (S-1) which have inherently high dark current. In the former case, the available range of illumination is limited by the inherently large beam divergence of the laser diode of the transmitter. In the latter case system performance is limited by the poor sensitivity of receivers in this wavelength region (1.06 microns). Enormous improvement of the long range viewing capability can be obtained by utilizing for the transmitter an optically pumped solid state laser operating in a spectral region bounded on the long wavelength side by the wavelength limit of good receiver performance and on the short wavelength side by the wavelength limits determined by the sensitivity of the human eye. This region presently extends from approximately 0.8 to 0.9 microns.

SUMMARY OF THE INVENTION

Accordingly, it is an object of this invention to provide an improved relatively covert laser system using a room temperature 0.85 micron optically pumped solid state laser.

It is another object of this invention to provide an optically pumped solid state laser which can operate with high efficiency in the spectral region of eye covertness and is compatible with high quantum efficiency low noise imaging devices.

It is a further object of this invention to provide a room temperature solid state laser operating in the 0.9–0.8 micron region for a long range communication based upon the low beam divergence of such device and the compatability with existing high efficiency receivers.

Briefly, systems are provided having an optically pumped solid state laser operating at 0.85 microns with high efficiency at room temperature and using an erbium doped lithium yttrium fluoride (LiYF$_4$) rod.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENT

Figure 1:
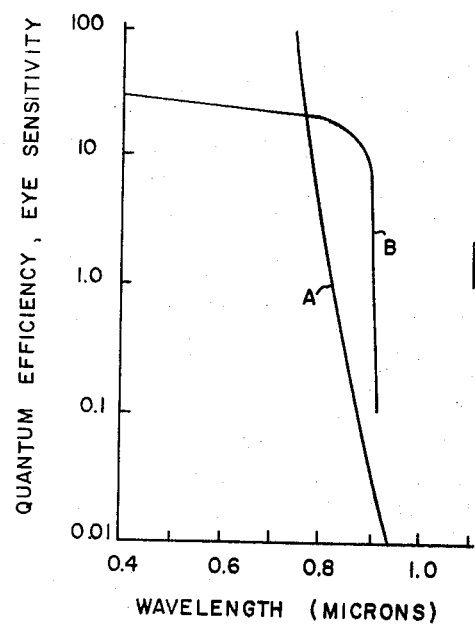
FIG. 1 are graphs illustrating the quantum efficiency of a GaAs(Cs) photomultiplier as a function of radiation wavelength and eye sensitivity as a function of radiation wavelength.

Referring to curve A of FIG. 1, which is a graph indicating sensitivity of the human eye to radiation, it is seen that beyond 0.8 microns the human eye is relatively insensitive to radiation. Curve A goes off scale on this graph, and in proper perspective, eye sensitivity is approximately $5 \times 10^8$ at 0.5 microns. This curve indicates the desirability of radiating at wavelengths greater than 0.8 microns for covert operation.

Curve B of FIG. 1, which is a graph indicating the quantum efficiency of a GaAs(Cs) photomultiplier, illustrates the desirability of not employing lasers having an output beyond 0.9 microns when a high quantum efficiency uncooled detector is to be used.

Thus it is seen that for optimum uncooled detector capability while maintaining covert operation, laser operation in the 0.8 to 0.9 micron region is desirable and in order to further simplify laser systems operating in the 0.8 to 0.9 micron region the laser also should be operated at or near room temperature.

In general the list of laser transitions between energy levels of rare earth ions and host materials for solid state lasers is extensive. Laser action in optically pumped solid state lasers is the result of absorption of pump radiation by impurity ions incorporated into the host material and relaxation of all the excited states to the initial (metastable) level until sufficient population inversion is obtained for oscillation threshold. High efficiency operation is dependent on a number of parameters determined by the host environment and the active ion species.

In general, high efficiency is obtained by choosing a laser transition which terminates on an unpopulated state at room temperature, and a host material which enhances the strength of the laser transition due to the site symmetry provided by the lattice. Further, a host material is chosen for which non-radiative decay out of the initial lasing state is a minimum. Still further, a host is chosen which is transparent in regions where the active ion absorbs radiation and the pumping source emits efficiently.

In general, the most efficient source compatible with solid state lasers is the Xenon flashlamp which emits most efficiently when operated with very high current density. Under these conditions, the emission is strongest in the region 0.2 to 0.6 microns. As a result, a host with optical transparency in this region is preferred because of the inherently high damage resistance of such a host to radiation in this region. Further, such a host will permit pumping of all the excited states of the active ion in this region.

In a preferred embodiment of the present invention it has been found that high optical transparency in the spectral region 0.2 to 3.0 microns occurs in undoped LiYF$_4$. Further, it has been found that this host provides a natural site for impurity rare earth ions allowing for arbitrarily high concentrations of impurity ions including active ions and other (sensitizing) ions to improve the pumping efficiency. Still further, the natural rare earth site provides a uniform environment for the active ions resulting in a narrow fluorescence linewidth at room temperature, hence a high gain for the laser transition.

In a preferred embodiment of the present invention it has also been found that erbium (Er$^{3+}$) incorporated into LiYF$_4$ exhibits a strong, polarized fluorescence in the 0.85 micron region. Further, the fluorescence lifetime is long at room temperature (greater than 500 microseconds in LiYF$_4$) allowing for good energy storage in laser operation. Still further, the 0.85 micron transition terminates in an unpopulated state at room temperature, providing for low threshold operation.

In a preferred embodiment of the present invention it is also found that the lifetime of the terminal state of the laser transition of the erbium ion can be substantially reduced by co-doping with terbium. As a result, depopulation of the terminal state population can be assured between pulses at up to − 100 pulses/sec. Still further, other rare earth ions, including thulium and dysprosium, may similarly be incorporated into the host material for improved pumping efficiency and additional decrease of the terminal state lifetime.

Figure 2:
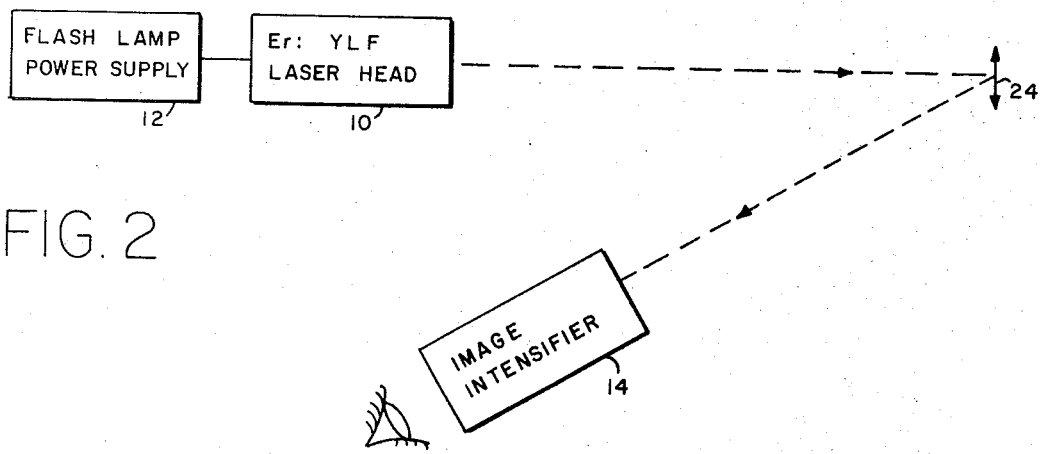
FIG. 2 is a block diagram of a long range viewing system utilizing a laser operating in the 0.85 micron region.
Figure 3:
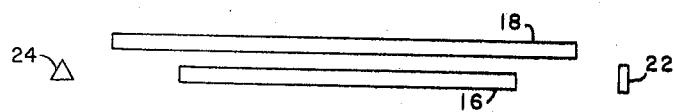
FIG. 3 is a sketch illustrating a laser utilized to provide the monochromatic radiation for the system of FIG. 2.

Referring now to FIG. 2, there is illustrated thereby a block diagram of a night viewing system comprising a transmitter including a laser head 10 and flashlamp power supply 12 and a receiver including an image intensifier 14. Laser head 10 is schematically shown in FIG. 3 and comprises an erbium doped lithium ytterbium fluoride rod 16, a Xenon flashlamp 18, a half-silvered mirror 20 and a Q-switch 22.

After a population inversion has been achieved by pumping, the rod 16 is made to lase in the pulse mode by Q-switch 22. The laser emits a beam of monochromatic 0.85 micron radiation which propagates through the air until it impinges on a target 24. Reflected light from target 24 impinges on image intensifier 14 where the target can be viewed by the user.

The laser rod 16 and image intensifier operate at ambient temperature and the image intensifier has an optimum response at or near the 0.85 micron wavelength of the laser.

Although the system described above is a night viewing system, this is shown for illustration purposes and the 0.85 micron laser also permits similar advances in range finders, target designators, communication systems, etc. Thus, it is to be understood that the embodiments shown are illustrative only, and that many variations and modifications may be made without departing from the principles of the invention herein disclosed and deferred by the appended claims.

We claim:
1. A laser system comprising:
    a transmitter including means for radiating a relatively covert monochromatic light beam, said radiating means including a solid state laser optically pumped by an incoherent source of energy and operated at ambient temperature, including room temperature and slightly elevated temperatures, at a wavelength of 0.8 to 0.9 microns; and
    a receiver including a detector having a quantum efficiency in excess of one percent and a photocathode with a dark current of less than $10^{-14}$ amperes/cm$^2$ at 22°C.

2. The system as defined in claim 1 wherein said system includes apparatus for long range viewing, said detector being an image intensifier.

3. The system as defined in claim 2 wherein said detector is uncooled.

4. The system as defined in claim 2, said laser including a rod which the host material is lithium yttrium fluoride and the active ion erbium.

* * * * *